June 24, 1930.  C. F. COWDREY  1,767,348
AUTOMOBILE BRAKE TESTING MACHINE
Filed July 23, 1928  4 Sheets-Sheet 1

INVENTOR:
Charles F. Cowdrey
BY Rob't O. Hains
ATTORNEY

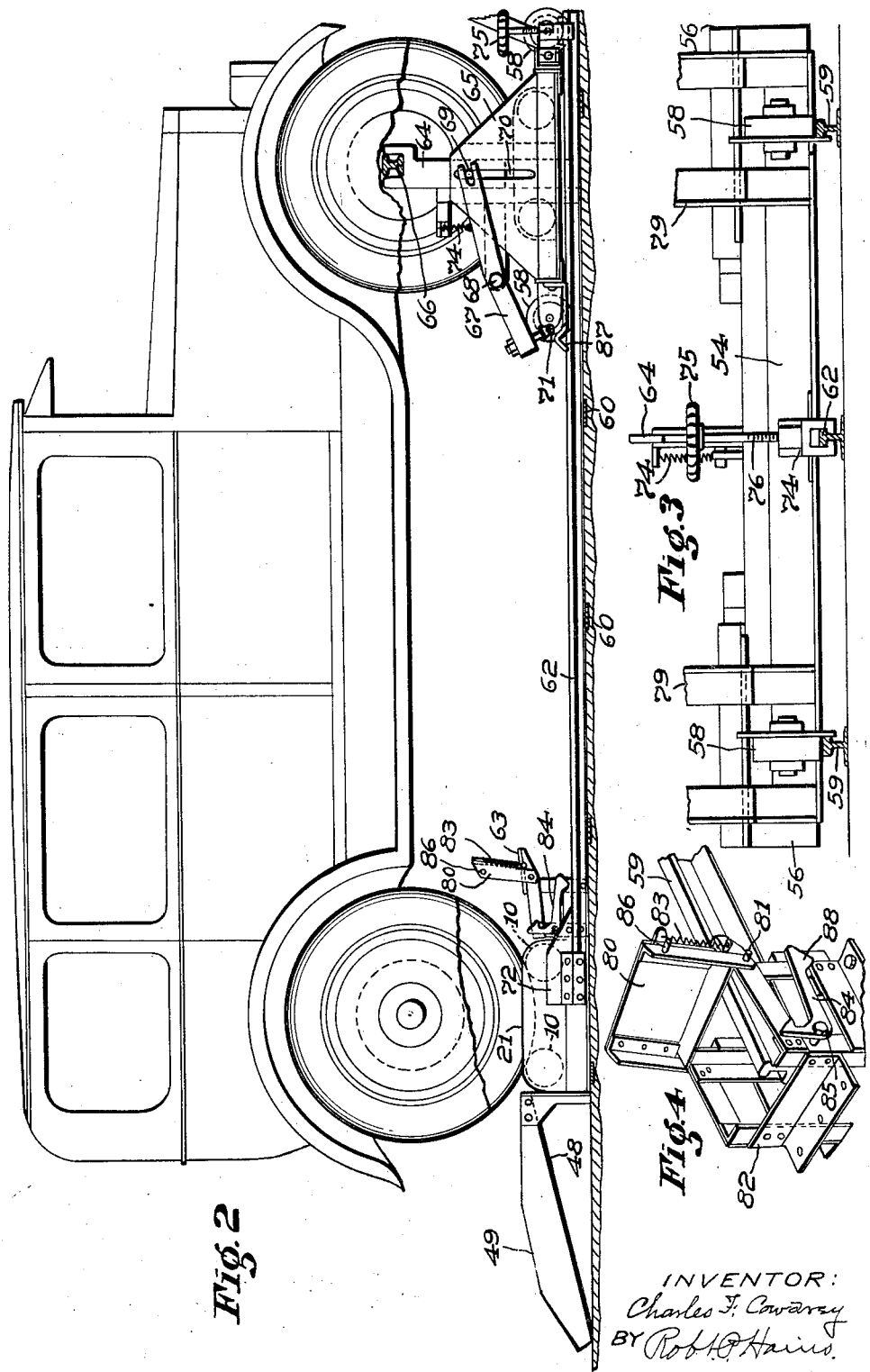

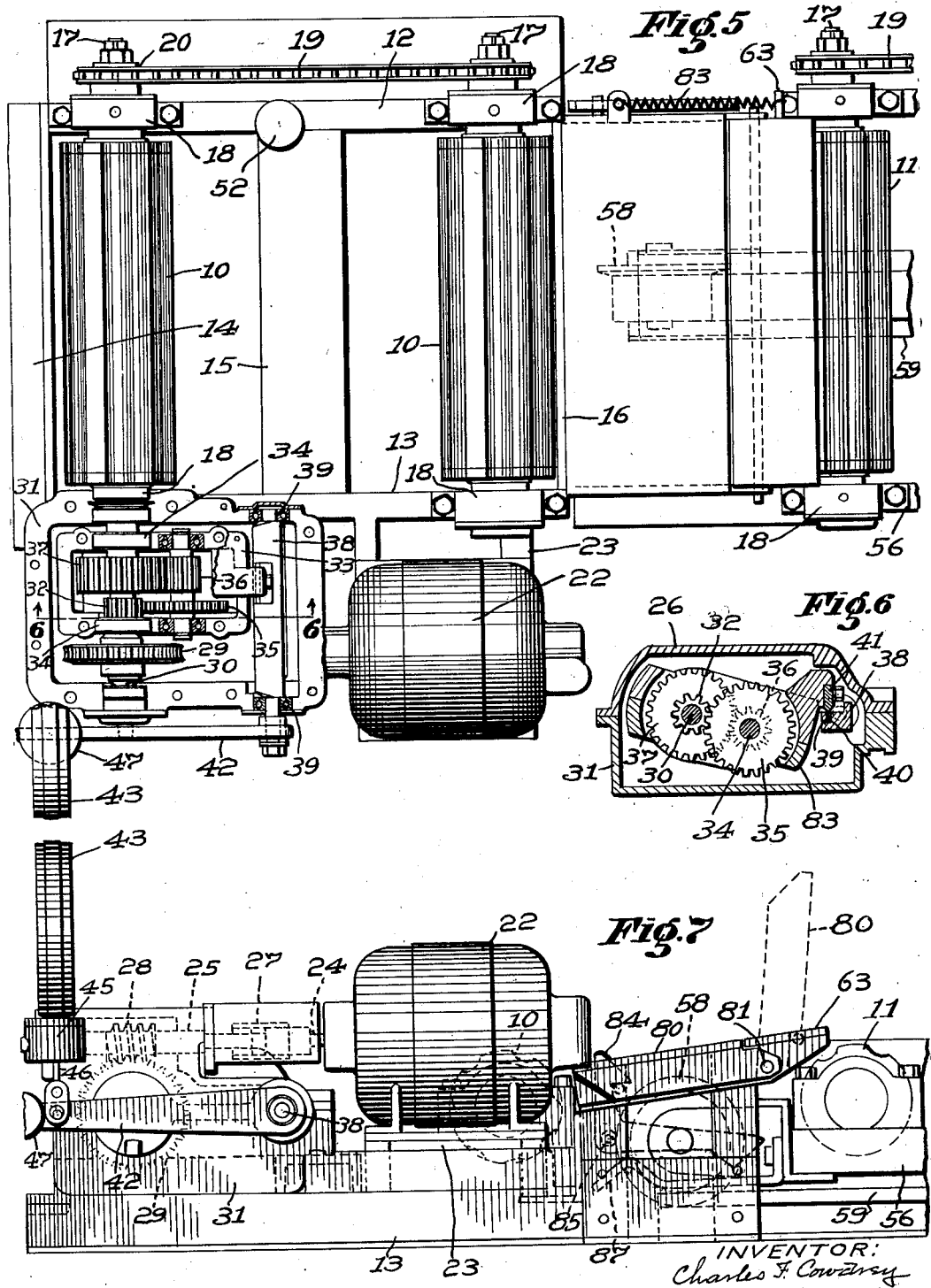

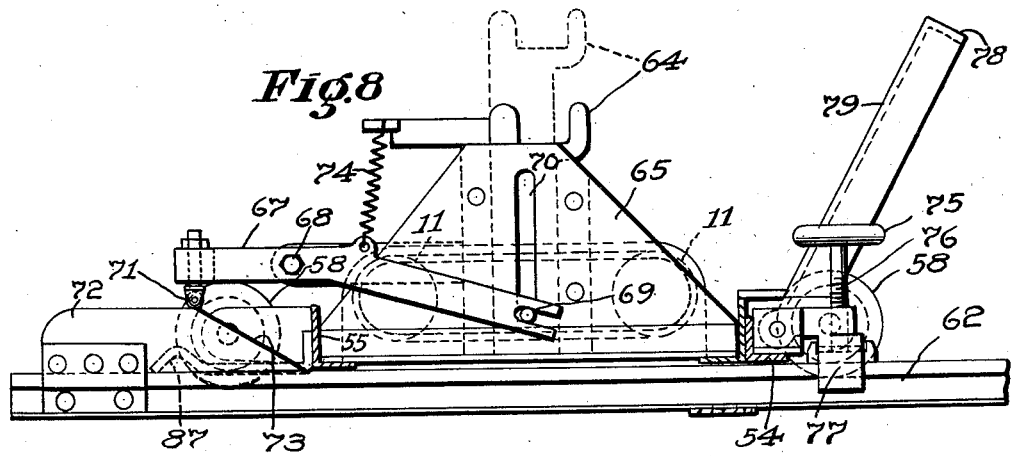
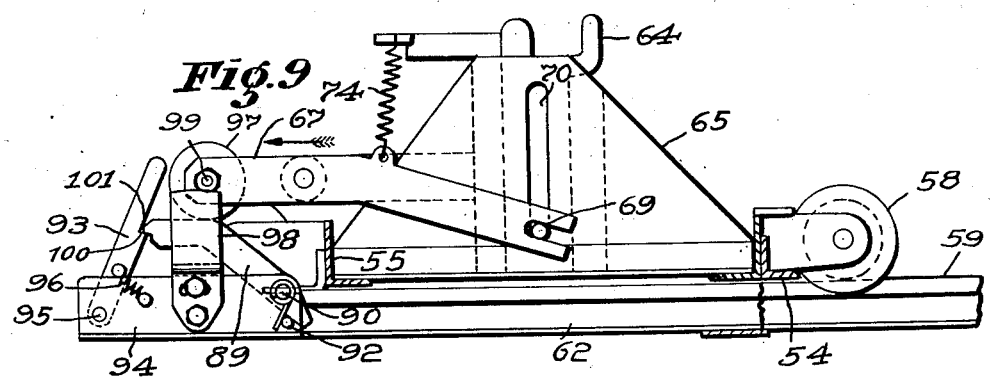
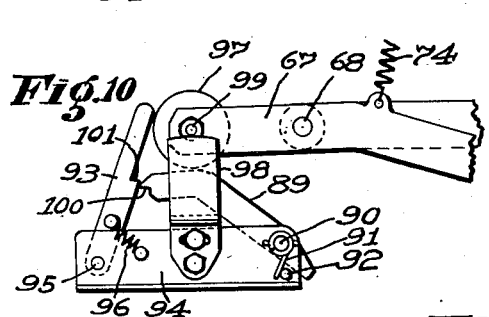
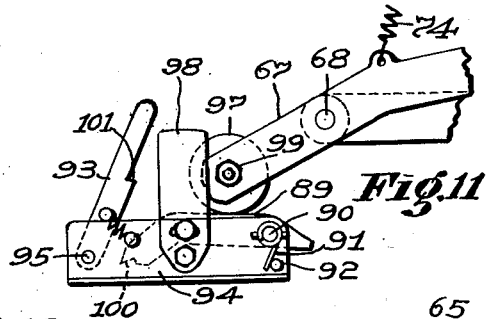
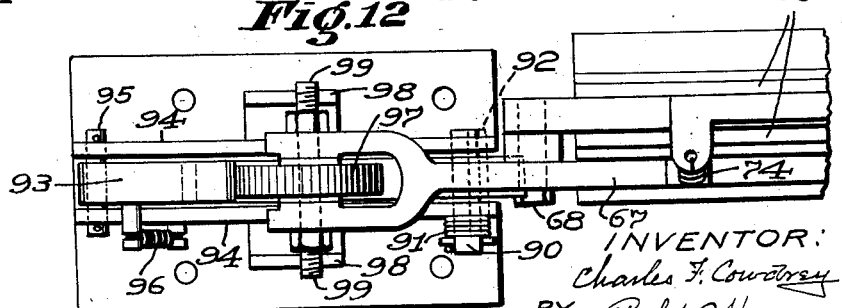

Patented June 24, 1930

1,767,348

UNITED STATES PATENT OFFICE

CHARLES FRANCIS COWDREY, OF FITCHBURG, MASSACHUSETTS, ASSIGNOR, BY MESNE ASSIGNMENTS, TO BENDIX-COWDREY BRAKE TESTER, INC., OF FITCHBURG, MASSACHUSETTS, A CORPORATION OF DELAWARE

AUTOMOBILE BRAKE-TESTING MACHINE

Application filed July 23, 1928. Serial No. 294,748.

This invention relates to improvements in brake testing machines for testing the action of the brakes upon the different wheels of an automobile.

It is extremely important that the brakes of an automobile be maintained in good condition and properly adjusted so that they will not only check the speed of an automobile quickly, but will exert equal or substantially equal retarding forces on the opposite sides of the automobile, for if the brakes act with greater retarding force on one side of the automobile than the other the automobile will tend to swerve from a straight path or skid when the brakes are applied.

In order to insure proper adjustment of the automobile brakes the action of the brakes upon the wheels of the automobile should be tested at frequent intervals, and it is found that the brakes of an automobile can be tested with a high degree of accuracy by rotating each wheel of the automobile under brake resistance and indicating the turning force applied to the wheel to turn it under the brake action.

Various forms of mechanism have been proposed heretofore for testing the action of the brakes upon the wheels of an automobile, and an excellent construction to this end which has gone into extensive use consists of power driven rollers adapted to support and to rotate the wheels of an automobile under brake resistance, and in indicating means associated with the rollers for each wheel to indicate the turning force imparted to the particular wheel to turn it under brake resistance.

The present invention is directed to various improvements designed more particularly for the type of brake tester just mentioned but which are applicable to this and other types of brake testers, whereby an automobile may be readily driven onto a brake testing machine under its own power and automatically anchored in place upon the brake testing machine ready to have its front and rear brakes tested.

It is desirable that the brake testing machine be so constructed that the action of the brakes upon the front and rear wheels of the automobile may be tested at the same time, and since some automobiles have a longer wheel base than others it is desirable to so construct the brake testing machine that the supporting rollers for the front wheels of an automobile may be readily moved relative to the supporting rollers for the rear wheels to accommodate automobiles of different length wheel base.

Having this in mind one of the features of the present invention resides in the construction of the brake testing devices for the front wheels of an automobile so that the automobile may be driven under its own power into a position in which the front wheels of the automobile rest upon the supporting rollers of the brake testing devices for the front wheels and will then push these brake testing devices forward as the automobile moves into a position to engage its rear wheels with the supporting rollers of the rear brake testing devices.

In testing the brakes of an automobile it is necessary to lock or anchor the automobile in its brake testing position to prevent the automobile from moving off of the brake testing device under the action of the turning force which is applied to the different wheels of the automobile to rotate them under brake resistance. Another feature of the present invention therefore resides in means which operates automatically to anchor the automobile upon the brake testing machine throughout the brake testing operation and which is automatically disengaged from the automobile as the latter is moved under its own power off of the brake testing machine.

Another feature of the present invention resides in wheel arresting means or stops which are disposed in front of the rollers for the rear wheels of the automobile, and which are adapted to prevent the rear wheels of the automobile from moving forward off of their supporting rollers during the brake testing operation, and in mechanism whereby these wheel arresting devices are automatically moved to and from their active position so that they will not interfere with the travel of the front wheels of the automobile to and from their brake testing position.

Still another feature of the present invention resides in improvements in the mechanism for indicating the turning force imparted to an automobile wheel to turn the wheel under brake resistance.

Other features of the invention and novel combination of parts in addition to the above will be hereinafter described in connection with the accompanying drawings which illustrate one good practical form of the invention.

In the drawings:—

Fig. 2 is a longitudinal sectional view of the brake testing machine of the present invention, having an automobile mounted thereon in the brake testing position, the central rail of the testing machine and the associated parts being shown in side elevation;

Fig. 3 is a front end view of the brake testing machine;

Fig. 4 is a perspective view of a wheel arresting device for a rear wheel of an automobile;

Fig. 5 is a top plan view of the brake testing mechanism for a rear wheel of an automobile and also of part of the brake testing mechanism for a front wheel of an automobile;

Fig. 6 is a sectional view taken on line 6—6 of Fig. 5 showing planetary gear mechanism to be described;

Fig. 7 is a side elevation of mechanism shown in Fig. 6;

Fig. 8 is a sectional view through the traveling carriage showing the automobile anchoring means in side elevation;

Fig. 9 is a view similar to Fig. 8 illustrating a modified form of mechanism for actuating the anchoring device;

Fig. 10 is a side view showing the mechanism of Fig. 9 in a different position;

Fig. 11 is a view similar to Fig. 10 but shows the roller actuating cam depressed; and Fig. 12 is a top plan view of the mechanism of Fig. 9.

Figure 1:
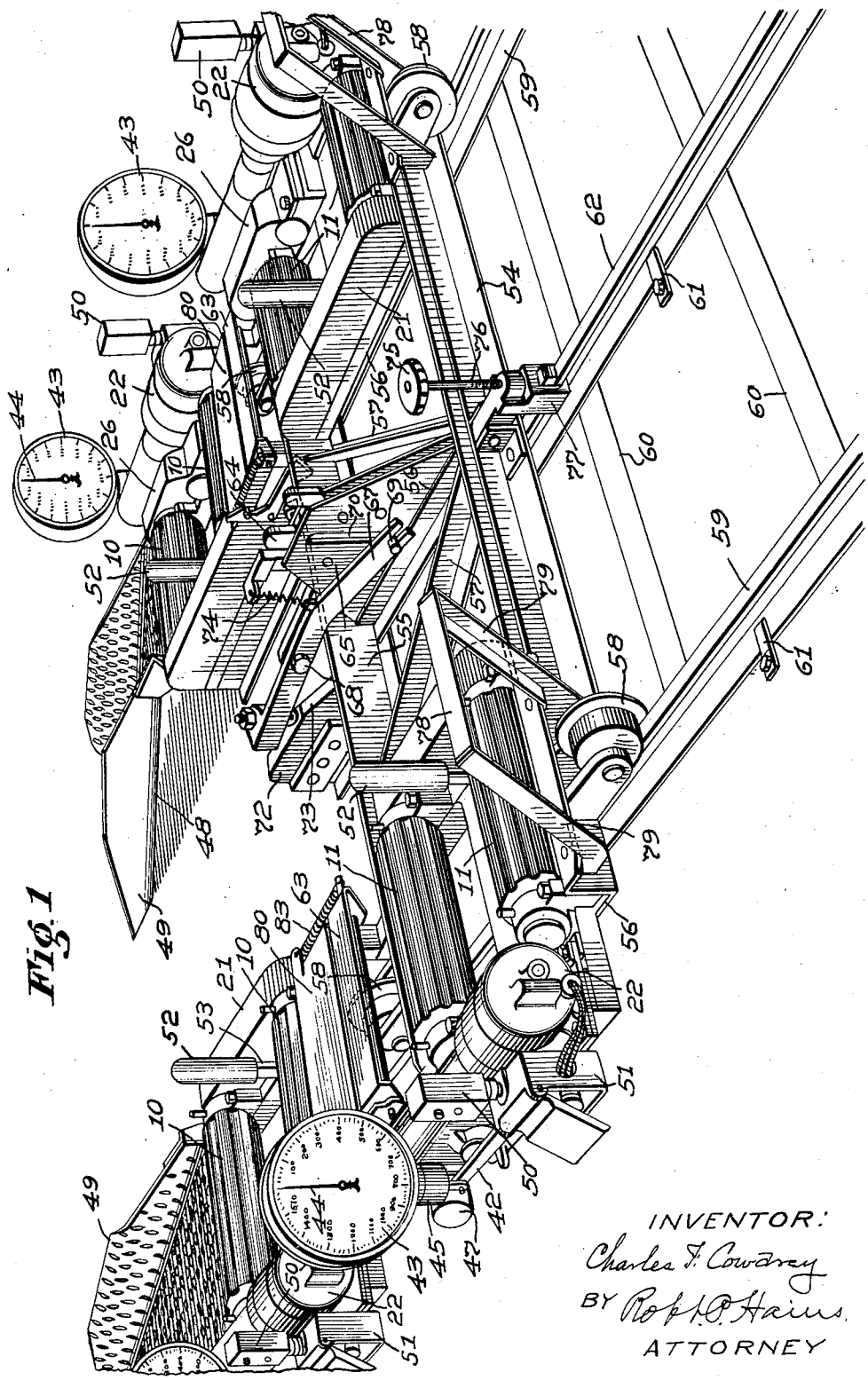
Fig. 1 is a perspective view of a brake testing machine constructed in accordance with the present invention, the carriage that supports the rollers for the front wheels of the automobile being shown in its rearmost position.

The brake testing machine forming the subject matter of the present invention is adapted to test the brakes upon the front and rear wheels of an automobile and is therefore provided with two rollers for supporting and rotating each wheel of an automobile. The rollers 10 for supporting and rotating the rear wheels of the automobile are mounted upon fixed supporting frames which frames are secured in spaced relation to each other to receive the rear wheels of the automobile, as will be apparent from Fig. 1, and the rollers 11 for supporting and rotating the front wheels of the automobile are mounted upon a traveling carriage which is supported for movement towards and from the rollers 10 under the action of the automobile as the latter is driven to and from its brake testing position, as will hereinafter more fully appear. The construction is such that the automobile, the brakes of which are to be tested, may readily be driven onto and off of the brake testing machine under its own power.

The brake testing devices for supporting and rotating the two rear wheels of the automobile are similar in construction and it will therefore be necessary to describe only one of these devices. In the construction shown a pair of rollers 10 for supporting and rotating a rear wheel of the automobile are disposed in spaced relation to each other so that the automobile wheel will rest upon these rollers, as will be apparent from Fig. 2, and these rollers are mounted upon a fixed frame, the construction of which is best shown in Fig. 5, as constituting a casting having the side beams 12 and 13 which are connected by the transversely extending beams 14, 15 and 16.

Each roller 10 is provided with a central shaft 17 which is journaled at its opposite ends in bearing blocks 18 mounted upon the side beams 12 and 13. Each roller 10 is rigidly secured to its supporting shaft and one of these rollers is driven by an electric motor and train of gears to be described, which are operatively connected to the roller supporting shaft 17, and the two rollers are connected by a sprocket chain 19 which engages sprockets 20 provided upon the shafts 17 so that rotative movement will be imparted from one roller 10 to the other by the sprocket chain 19. This chain is preferably enclosed in a protecting casing 21, as will be apparent from Fig. 1.

In order to determine the retarding force which a brake exerts upon the automobile wheel being tested it is necessary to rotate the wheel under brake resistance, and also to indicate the turning force applied to the wheel to turn the same under the brake action. It is obvious that the automobile wheel may be rotated under brake resistance by rotating the wheel supporting rollers 10 and these rollers are preferably given a rough or fluted surface as shown, to increase the traction between these rollers and the wheel which they rotate. The means for driving these rollers 10 and for indicating the turning force applied to said rollers will now be described.

The rollers are conveniently driven from a small electric motor 22 which may be rigidly secured to a supporting bracket 23 that projects latterly from the roller supporting frame above described. The power shaft 24 of the motor 22 is connected to an aligned driving shaft 25 the ends of which shaft are journaled in bearings formed in the upper portion of the cover plate 26 of the gear casing to be described, and the shafts 24 and 25 are preferably connected by a flexible coupling 27.

It is desirable to rotate the wheel supporting rollers 10 at a relatively slow speed as this will afford a better opportunity to observe the action of a brake upon an automobile wheel throughout the complete revolution of the wheel and to determine any variations in the brake retarding force due to defects in the brake mechanism, and it will also permit the use of a smaller driving motor 22. It is therefore desirable to employ a train of reducing gears between the driving motor and roller 10 driven thereby, and in accordance with the present invention, in order to determine the turning force imparted to the wheel supporting rollers, a floating gear driving connection is employed, the arrangement being such that the floating gear or gears will tend to move in a circular path as the turning force imparted to the automobile wheel increases, and this movement of the floating gears is utilized to operate an indicator, as will be hereinafter explained.

The driving shaft 25 is provided with a worm 28 which meshes with a worm gear 29 and this worm gear is mounted upon a transversely extending shaft 30 which is positioned in alignment with a roller supporting shaft 17, as will be apparent from Fig. 5. This shaft may have its outer end journaled in a bearing supported by the lower portion 31 of the gear casing and its inner end is preferably journaled in a bearing formed within the driving gear which is secured to the inner end of the shaft 17.

The gear 29 and a pinion 32 are keyed or otherwise rigidly secured to the shaft 30. The floating gears to be described are supported by a floating frame 33 which is supported for rocking movement about the aligned shafts 17, 30, and to this end each of the shafts 17 and 30 is provided with a bearing 34 which constitutes the fulcrum about which the frame 33 rocks. The rocking frame 33 carries the transversely extending shaft 34 the ends of which shaft are journaled in the opposite side walls of the frame. Upon the shaft 34 is rigidly secured a gear 35 which meshes with and is driven by the pinion 32 and this shaft 34 is also provided with a smaller gear 36 which meshes with and drives the gear 37, this last mentioned gear being rigidly secured to the roller supporting shaft 17 and is constructed to form a bearing for the inner end of the shaft 30 as above mentioned.

It will be apparent from the above description of the operating gears that they constitute a slow but powerful drive for the rollers 10 and serve to turn the automobile wheel under powerful brake resistance, and it will also be seen that as the turning force transmitted by the gears increases, the rocking frame 33 will tend to rock about its supporting shafts, 17, 30. Various means might be employed for utilizing this rocking movement of the frame 33 to actuate an indicating device, to indicate the turning force imparted to the automobile wheel, and an extremely simple and satisfactory means to this end will now be described.

The various gears shown in Figs. 5 and 6 are preferably enclosed in a tight casing formed of the gear box 31 and the cover plate 26 which cover plate may be firmly bolted to the gear box 31. This gear casing is preferably rigidly secured to the roller supporting frame or an extension provided thereon as will be apparent from Fig. 7.

Within the fixed gear casing is mounted a transversely extending shaft 38 the opposite ends of which are journaled in bearings 39. This shaft is disposed adjacent the outer end of the rocking frame 33 and is adapted to oppose the rocking action of such frame and to transmit this force to an indicating device, and to this end the shaft 38 is provided with an offset portion 39 in which is preferably mounted a bearing block 40 of hardened metal and this bearing block is positioned to receive the downward thrust exerted thereupon by a hardened block 41 which is secured to the outer end of the rocking frame 33; the latter block being preferably provided with a knife edge bearing, as shown in Fig. 6. The force transmitted by the gears to the automobile wheel will cause the rocking frame 33 to exert a downward thrust upon the offset portion of the shaft 38. This shaft is provided with an end portion which extends through a side wall of the fixed gear casing and upon this end portion is rigidly secured a lever arm 42 which preferably extends rearwardly away from the driving motor 22, as will be apparent from Figs. 5 and 7. The rocking movement of the lever arm 42 under the action of the driving gears is utilized to actuate an indicator 43 having a pointer 44 adapted to swing over the face of a graduated dial. The indicator 43 is preferably provided with a downwardly extending sleeve which is journaled in a supporting bracket 45, which bracket may be secured to the lower portion of the gear casing 31 or other portion of the supporting frame; the arrangement being such that the indicating device 43 may be turned to face in different directions in order that it may be readily observed from any desired point of observation.

The outer end portion of the lever arm 42 is connected to the indicating device by the rod or wire 46 which extends upwardly into the indicator casing through its supporting sleeve. The arrangement is such that the actuating spring within the indicating casing 42 will normally hold the lever arm 42 in the substantially horizontal position in which it is shown in Fig. 7 and as the turning force transmitted by the driving gears increases the arm 42 will move downwardly slightly to thereby tension the spring within the indicator 43 and operate the pointer 44. The lever arm 42 may be provided with a weight 47 at its outer end adapted to urge the arm 42 downwardly with sufficient force to take up the slack of the various operating parts.

Each rear brake testing device is preferably provided with an inclined runway 48 constructed so that an automobile may be driven onto the brake testing machine under its own power, and these runways 48 are preferably provided with the upstanding side walls 49 adapted to guide the automobile wheels along the runway.

The driving motor 22 may be controlled by a push button switch mounted within the casing 50 which is shown as mounted upon the fuse box 51 in which the electric fuse may be housed. It is desirable to provide means for preventing the automobile wheels from working lengthwise of the supporting rollers 10 during the brake testing operation and thus working off from the rollers. This is readily prevented by providing each brake testing device with a roller 52 adapted to rotate about a vertical shaft 53 which supports this roller 52 in position to engage the inner face of an automobile wheel and thus limit the travel of the wheel lengthwise of the rollers 10 towards the inner ends of these rollers.

The pair of brake testing devices above described will serve to rotate the rear wheels of an automobile and indicate the turning force applied to each wheel so that the action of the brakes upon these two rear wheels may be compared and equalized, but since many automobiles now in use are provided with four-wheel brakes, it is desirable to provide means for testing simultaneously the front and rear brakes of the automobile; and as some automobiles are of greater length than others, that is, have a greater wheel base, it is desirable to provide the rollers 11 for supporting the front wheels for movement relatively to the rollers 10 to accommodate automobiles of various length wheel base, and mechanism will now be described to this end.

In accordance with the present invention the rollers 11 for supporting the opposite front wheels of an automobile are mounted upon a traveling carriage consisting of the transversely extending beams 54 and 55 which are connected by the longitudinally extending braces 56 and the diagonally extending braces 57, and the carriage thus constructed is provided with the front and rear flanged wheels 58 journaled upon the carriage and adapted to travel along the carriage supporting rails 59 disposed at the right and left hand sides of the brake testing machine approximately under the front wheels of the automobile to be tested. The rails 59 may be secured in spaced relation to each other by the transversely extending braces 60 and may be clamped or otherwise secured to the floor of the building by the rail clamping devices 61. In the construction shown a central rail 62 is provided and has anchoring means associated therewith to be described for anchoring the carriage in a fixed position during the brake testing operation.

The carriage supporting rails 59 are relatively long and extend back into close proximity to the rollers 10 for the rear wheels of the automobile, the construction being such that the traveling carriage may be moved rearwardly into close proximity to the rear brake testing devices, and the carriage remains in this rearmost position while the front wheels of the automobile are moved into and out of engagement with the wheel supporting rollers 11, but after the front wheels have been engaged with these rollers the carriage is moved frontwardly by the automobile from the position in which the carriage is shown in Fig. 1 to the position in which it is shown in Fig. 2.

As a result of this construction it is necessary to provide only a short runway 63 adjacent the rear supporting rollers 10 to support each front wheel of the automobile as these wheels pass from the rear rollers 10 onto the rollers 11 of the traveling carriage. Each runway 63 is rigidly connected to the fixed frame and preferably extends over the rear roller 11 of the carriage sufficiently to cause the front wheel to drop into the space between the two rollers 11 as the wheel rolls off of the runway 63 onto the carriage supporting rollers; thus insuring engagement of the front wheels of the automobile with the spaced supporting rollers 11 before the carriage is pushed frontward under the forward movement of the automobile.

After the brake testing operation is completed and the automobile is driven rearwardly under its own power the rear wheels will back off of the rollers 10 and down the runways 48 while the front carriage will be moved rearwardly by the front automobile wheels until the carriage reaches its rearmost position, whereupon the front wheels will roll onto the runway 63 and over the rear supporting rollers 10 entirely off the brake testing machine. It is important to note that this entire operation of placing the automobile on the brake testing machine and removing it therefrom is accomplished merely by driving the automobile under its own power into and out of the brake testing position.

The front rollers 11 like the rear rollers 10 are driven by electric motors 22 and the gear driving mechanism and indicating mechanism provided for the front rollers 11 may be the same as that above described for the rear rollers. It will therefore be unnecessary to describe in detail the train of reducing gears, floating gear mechanism and connections for operating the indicators 43 associated with the front brake testing devices, since such mechanism is similar to the mechanism above described but is mounted upon the traveling carriage.

It is necessary to provide means for locking or anchoring the automobile in its brake testing position in order to keep the automobile from moving off of the supporting rollers 10 and 11 under the force imparted to the automobile wheels as these rollers are driven to turn the wheels under brake resistance. Having this in mind the present invention contemplates means adapted to be moved automatically into the automobile anchoring position as the automobile approaches its final brake testing position and for automatically releasing the automobile upon completion of the brake testing operation. This anchoring means, in accordance with the present invention, is controlled by the back and forth movement of the carriage, the construction being such that as long as the carriage is in its rearmost position the anchoring means 64 is held in its depressed position in which it is shown in full lines in Figs. 1 and 8, and when the carriage is moved frontwardly the anchoring means 64 is moved upwardly into the position in which it is shown in dotted lines in Fig. 8 and full lines in Fig. 2. This anchoring device constitutes a bar which is supported by the side plates 65 for vertical sliding movement and the upper end of the anchoring device is forked and is adapted to straddle the front axle 66 of an automobile, as will be apparent from Fig. 2.

The side plates 65 are rigidly secured to a central portion of the traveling carriage above the central rail 62, as will be apparent from Fig. 1 and the movement of the anchoring devices 64 into and out of engagement with the automobile axle is controlled by a rocking lever 67 which is pivotally supported upon the carriage at 68 the forward end of this lever is bifurcated and is adapted to receive a pin 69 secured to the post of the anchoring device 64 and this pin projects through a clearance slot 70 formed in a side plate 65. When the carriage is in its rearmost position in which it is shown in Fig. 1 the anchoring device is held in its depressed position by a roller 71 mounted at the rear end of the lever 67 and positioned to engage a block 72 mounted upon the central rail 62 and having a cam face 73 adapted to engage the roller and force the rocking lever 67 to the position in which it is shown in Fig. 1. As the carriage moves frontwardly the roller 71 will be moved out of engagement with the operating cam block 72 whereupon the forward end of the lever 67 will be rocked upwardly under the influence of the spring 74 to move the anchoring device into engagement with the front axle 66 of the automobile.

As soon as the automobile has reached its final brake testing position in which it is shown in Fig. 2 the carriage may be clamped in this position by simply rotating the hand wheel 75 which is secured to the upper end of the clamping bolt 76 to cause the clamping device 77 to grip the upper flange of the central rail 62. In order to prevent any possibility of the front wheels of the automobile passing forward entirely off the roller supporting carriage, the wheel arresting bars 78 may be supported in front of the forward rollers 11 by the upwardly extending posts 79 the lower ends of which are secured to the carriage supporting frame.

It is desirable to provide means for preventing the rear wheels of an automobile from moving forward beyond the forward supporting rollers 10 and this is accomplished by providing the wheel arresting bars or plates 80 which are disposed in front of these rear wheels, as will be apparent from Figs. 2 and 4. It is important, however, that the devices 80 for arresting the forward movement of the rear wheels of the automobile be constructed so that they may be moved to and from their active position so that they will not interfere with the front wheels of the automobile, as such front wheels travel along the runways 63 towards and from the front rollers 11.

Another important feature of the present invention therefore resides in mechanism whereby the wheel stopping devices 80 are automatically moved to and from the wheel arresting position in which they are shown in Figs. 2 and 4 and to this end in the construction shown these devices 80 constitute plates which when moved to the lowered position in which they are shown in Fig. 1 form a part of the runway 63. These wheel arresting devices 80 are pivotally secured at 81 to a supporting frame 82 which frame is adapted to be rigidly secured to the structure for supporting the rear rollers 10.

The wheel arresting devices 80 are urged to their raised position in which they are shown in Fig. 2 by springs 83 but are normally held depressed by latches 84 pivotally secured to the frame 82 at 85, the construction being such that when an automobile is backed off of the brake testing machine the front wheels will engage the stopping devices 80 and force them downward into their depressed position in which they are shown in Fig. 1 whereupon they will be secured in this depressed position by the latches 84 which engage the pins 86. The wheel arresting devices 80 will be held in such depressed position by the latches 84 until these latches are tripped and this is accomplished by tripping devices 87 secured to the rear portion of the traveling carriage, the arrangement being such that these tripping devices 87 occupy the position in which they are shown in Fig. 7 as long as the carriage is in the rearward position, but as the carriage is moved forward after the front wheels of the automobile have been driven into engagement with the supporting rollers 11 the forward travel of the carriage will cause the tripping device 87 to engage the outer ends 88 of the latches to force these ends upwardly and thereby release the latches so that the stopping devices 80 may be swung upwardly under the influence of the springs 83. It will therefore be seen that the movement of the stopping devices 80 for the rear wheels of the automobile is effected automatically to and from their raised position.

In some cases it may be found that the mechanism above described and which is best shown in Fig. 8 for moving the anchoring device 64 into and out of the automobile anchoring position will not operate as quickly as desired, as it will be apparent from the construction shown in Fig. 8 that the anchoring device cannot move upwardly to its highest position until the carriage has moved forward sufficiently to disengage the roller 71 from the cam face 73. Having this in mind a modified form of mechanism is shown in Figs. 9 to 12 inclusive, whereby the anchoring device 64 will move quickly in engagement with the front axle of the automobile as soon as a slight forward movement has been imparted to the carriage.

This is accomplished by providing the modified construction of Figs. 9 to 12 inclusive with a collapsible ramp 89 which is mounted for swinging movement about the pivotal support 90 which serves to secure this ramp to an end of the central rail 62 or other fixed supporting structure. The ramp 89 is normally urged upwardly to the position in which it is shown in Fig. 9 by the coiled spring 91 and the movement of the ramp upwardly is arrested by the engagement of the lower end of the ramp with the fixed pin 92. The ramp 89 is held in the raised position in which it is shown in Fig. 9 by the post 93 the lower end of which is pivotally secured to the supporting plates 94 by the pivot pin 95 and this post is urged to the ramp supporting position in which it is shown in Fig. 9 by the spring 96.

The post 93 it should be noted has an upwardly extending end that lies within the path of the rail engaging roller 97 which roller is pivotally secured to an end of the rocking lever 67 above described. The arrangement is such that when the carriage which supports the front brake tester is moved to the position in which it is shown in Fig. 1 the roller 97 will strike the post 93 and force the same to the ramp releasing position in which it is shown in Fig. 10. When this occurs the roller carrying end of the lever 67 will move downwardly slightly under the action of the spring 74 between the spaced posts 98 positioned to engage the pivot shaft 99 of the roller 97 and hold the lever 67 sufficiently elevated to maintain the automobile anchoring device 64 in the depressed position in which it is shown in Figs. 9 and 10. When, however, the carriage is moved forward slightly relatively to the supporting post 98 the shaft 99 will be moved out of engagement with the upper ends of the posts 98 whereupon the roller carrying end of the lever 67 will rock downwardly to the position in which it is shown in Fig. 11. This will quickly move the anchoring device into the axle-engaging position in which it is shown in Fig. 2.

The downward movement of the roller 97 will force the ramp 89 to its completely collapsed position in which it is shown in Fig. 11. As soon as the carriage is moved forward sufficiently to move the roller 97 out of engagement with the ramp 89 the ramp will move upwardly under the action of the spring 91 into the elevated position in which it is shown in Fig. 9 and will be held in this position by the engagement of the rearwardly extending lip 100 with the shoulder 101 upon the post 93 so that the ramp will serve to actuate the lever 67 and retract the anchoring device 64 when the carriage is again moved to the position in which it is shown in Fig. 1.

It will be seen from the foregoing that the brake testing machine of the present invention is so constructed that an automobile is easily driven onto and off of the brake testing machine under its own power and that the means for anchoring the automobile in its brake testing position is actuated automatically by the movement of the automobile to and from such position. It will also be seen that the wheel arresting devices 80 for the rear wheels of the automobile are likewise moved to and from their elevated position by the movement of the automobile to and from its final brake testing position. It will also be understood that since a separate and independently operable brake tester is provided for each wheel of the automobile, the action of the brake upon each wheel may be tested independently, or the action of the brakes upon all four wheels may be tested simultaneously, and the indicators 43 may be turned to face in any desired direction so that two or more may be read from a common observation point.

While the means herein shown and described for testing the brakes of an automobile by rotating a wheel under brake resistance and indicating the force applied, gives excellent results in practice, it will be understood that the mechanism herein described for automatically actuating the anchoring device and rear wheel arresting devices, as well as other features of the present invention may be employed in connection with various types of brake testing machines.

What is claimed is:

1. An apparatus for testing brakes of automobiles, comprising in combination, a fixed support provided with means for rotatably supporting a wheel of an automobile, a carriage mounted for movement by the automobile toward and from said fixed support, power mechanism for rotating the wheel resting upon said supporting means, an indicator associated therewith for indicating the action of the brake upon the rotating wheel, wheel arresting means associated with said support and mounted for movement to and from its wheel arresting position, and means under the control of the carriage movement for positioning said wheel arresting means.

2. An apparatus for testing brakes of automobiles, comprising in combination, a fixed support provided with means for supporting and rotating a wheel of an automobile, a carriage mounted for movement toward and from said fixed support and provided with means for supporting and rotating a second wheel of the automobile, power mechanism for actuating said wheel supporting and rotating means, indicating means associated therewith for indicating the action of the brake upon the wheel, wheel arresting means associated with said support and mounted for movement to and from its wheel arresting position, and means for positioning the wheel arresting means and adapted to be actuated by the movement of the automobile relative to the fixed support.

3. An apparatus for testing brakes of automobiles, comprising in combination, a support provided with means for supporting and rotating a wheel of an automobile, power mechanism for driving the wheel supporting and rotating means, an indicator for indicating the action of the brake upon the wheel, wheel arresting means associated with said support and mounted for movement to and from its wheel arresting position, and means for positioning the wheel arresting means and adapted to be actuated by the movement of the automobile relative to said support.

4. An apparatus for testing brakes of automobiles, comprising in combination, a support provided with means for supporting and rotating a wheel of an automobile, power mechanism for driving the wheel supporting and rotating means, an indicator for indicating the turning force applied to the wheel, wheel arresting means associated with said support for movement to and from its wheel arresting position, means for urging the wheel arresting means to its wheel arresting position, and latch means for normally holding the wheel arresting means out of the wheel arresting position.

5. An apparatus for testing brakes of automobiles, comprising in combination, a support provided with means for supporting and rotating a wheel of an automobile, power mechanism for driving said wheel supporting and rotating means, an indicator for indicating the turning force applied to the wheel, a platform plate associated with said support and adapted to be moved from a wheel supporting position to a wheel arresting position, and means under the control of the movement of the automobile relative to said support for positioning said plate.

6. An apparatus for testing brakes of automobiles, comprising in combination, a fixed support provided with rollers for supporting and rotating a wheel of an automobile, a carriage mounted for movement by the automobile relative to the fixed support and provided with rollers for supporting and rotating a second wheel of the automobile, power mechanism for rotating said rollers, means for indicating the turning force applied to the the rollers to turn the wheels under brake resistance, wheel arresting means associated with said support, and means controlled by movement of the carriage in a direction away from said fixed support to shift said wheel arresting means to its wheel arresting position.

7. An apparatus for testing brakes of automobiles, comprising in combination, a fixed support provided with rollers for supporting and rotating the rear wheel of an automobile, a carriage mounted for movement by the automobile and provided with rollers adapted to support and rotate the front wheel under brake resistance, power mechanism for driving said rollers, means for indicating the turning force applied to the rollers to turn the wheels under brake resistance, wheel arresting means for preventing the rear wheel of the automobile from moving forward off of its supporting rollers, and means controlled by movement of the carriage for automatically raising the wheel arresting means as the automobile moves forward and for depressing it as the automobile moves rearward.

8. An apparatus for testing brakes of automobiles, comprising in combination, means for supporting and rotating the front and rear wheels of an automobile, power mechanism for driving said wheel supporting and rotating means to turn the wheels under brake resistance, means for indicating the turning force applied to each of said wheels to turn it under brake resistance, wheel arresting means for preventing the rear wheel from running off its supporting and rotating means, and means controlled by movement of the carriage for moving the wheel arresting means to its active position as the automobile moves forward and for moving it to its inactive position as the automobile moves rearward.

9. An apparatus for testing brakes of automobiles, comprising in combination, a fixed support provided with rollers for supporting and rotating the rear wheel of an automobile, a carriage mounted for movement by the automobile and provided with rollers adapted to support and rotate the front wheel under brake resistance, power mechanism for driving said rollers, means for indicating the turning force applied to the rollers to turn the wheels under brake resistance, wheel arresting means mounted upon the fixed support for movement to and from the wheel arresting position, means for yieldingly urging the wheel arresting means to its active possition, a latch for holding the wheel arresting means in its inactive position and adapted to be actuated by the movement of the carriage to release the wheel arresting means so that it will move to the wheel arresting position.

10. An apparatus for testing brakes of automobiles, comprising in combination, a fixed support provided with rollers for supporting and rotating the rear wheel of an automobile, a carriage mounted for movement by the automobile and provided with rollers adapted to support and rotate the front wheel under brake resistance, power mechanism for driving said rollers, means for indicating the turning force applied to the rollers to turn the wheels under brake resistance, wheel arresting means mounted across the path traveled by the front automobile wheel in moving to its brake testing position, means for holding said wheel arresting means depressed until after the front wheel has passed over the same and means controlled by movement of the carriage to effect movement of the wheel arresting means into position to arrest the forward movement of the rear automobile wheel.

11. An apparatus for testing brakes of automobiles, comprising in combination, means for supporting and rotating the rear wheels of an automobile, a carriage mounted for movement toward and from said supporting and rotating means and provided with means for supporting and rotating the front wheels of the automobile, power mechanism for driving said supporting and rotating means, indicating mechanism for indicating the brake retarding action on said wheels, and automobile anchoring means adapted to be moved by the travel of said carriage into and out of engagement with an axle of the automobile.

12. An apparatus for testing brakes of automobiles, comprising in combination, means for supporting and rotating the rear wheels of an automobile, a carriage mounted for movement by the automobile toward and from said supporting and rotating means and provided with means for supporting and rotating the front wheels of the automobile, power mechanism for driving said supporting and rotating means, indicating mechanism for indicating the brake retarding action on said wheels, automobile anchoring means mounted on the carriage for movement into and out of engagement with a portion of the automobile being tested, and means controlled by the movement of the carriage for moving the anchoring means into and out of anchoring engagement with the automobile.

13. An apparatus for testing brakes of automobiles, comprising in combination, means for supporting and rotating the rear wheels of an automobile, a carriage mounted for movement by the automobile toward and from said supporting and rotating means and provided with means for supporting and rotating the front wheels of the automobile, power mechanism for driving said supporting and rotating means, indicating mechanism for indicating the turning force applied to said wheels, automobile anchoring means mounted on the carriage for movement into and out of engagement with a portion of the automobile being tested, and means controlled by movement of the carriage to engage said anchoring means with the automobile as the carriage moves forward, and to disengage the anchoring means as the carriage moves toward its rearmost position.

14. An apparatus for testing brakes of automobiles, comprising in combination, a traveling carriage provided with means for supporting and rotating a pair of wheels of an automobile, power mechanism for driving said supporting and rotating means, indicating mechanism for indicating the turning force applied to said wheels, automobile anchoring means mounted on the carriage for movement into and out of engagement with a portion of the automobile being tested, and means controlled by the movement of the carriage for moving the anchoring means into and out of anchoring engagement with the automobile.

15. An apparatus for testing brakes of automobiles, comprising in combination, means for supporting and rotating a wheel of an automobile, power mechanism for driving said means to rotate the wheel under brake resistance, indicating mechanism for indicating the turning force applied to said wheel by said means, and automobile anchoring means for anchoring the automobile in its brake testing position and constructed to be placed in anchoring engagement with the automobile by the movement of the automobile in one direction and to be released from the automobile by the movement of the automobile in the opposite direction.

16. An apparatus for testing brakes of automobiles, comprising in combination, means for supporting and rotating the two opposite wheels of an automobile and constructed so that the automobile may be driven under its own power on and off of said means, power mechanism for driving said means to rotate the wheels under brake resistance, indicating mechanism for indicating the turning force applied to said wheel by said means, automobile anchoring means for anchoring the automobile in its brake testing position, and mechanism for moving the anchoring means automatically to and from its active position and constructed to be controlled by the forward and rearward movement of the automobile.

17. An apparatus for testing brakes of automobiles, comprising in combination, means for supporting and rotating a wheel of an automobile, power mechanism for driving said means to rotate the wheel under brake resistance, indicating mechanism for indicating the turning force applied to said means, anchoring means for holding the automobile in the brake testing position, and mechanism adapted to be actuated by the movement of the automobile to disengage the anchoring means from the automobile.

18. An apparatus for testing brakes of automobiles, comprising in combination, means for supporting and rotating the rear wheels of an automobile, power mechanism for driving said means to rotate the wheels under brake resistance, indicating mechanism for indicating the turning force applied to said wheels by said means, a traveling carriage for supporting the front wheels of the automobile and adapted to be moved by the movement of the automobile to and from its brake testing position, anchoring means for holding the automobile in its brake testing position, and means controlled by the travel of the carriage for moving the anchoring means to and from its active position.

19. An apparatus for testing brakes of automobiles, comprising in combination, means for supporting and rotating the rear wheels of an automobile, power mechanism for driving said means to rotate the wheels under brake resistance, indicating mechanism for indicating the turning force applied to said wheels by said means, a traveling carriage for supporting the front wheels of the automobile and adapted to be moved by the movement of the automobile to and from its brake testing position, anchoring means for holding the automobile in its brake testing position, and mechanism for moving the anchoring means to and from its active position including an actuator movable with the carriage and a fixed cam for shifting the actuator in response to the carriage movement.

20. An apparatus for testing brakes of automobiles, comprising in combination, means for supporting and rotating the rear wheels of an automobile, power mechanism for driving said means to rotate the wheels under brake resistance, indicating mechanism for indicating the turning force applied to said wheels by said means, a traveling carriage for supporting the front wheels of the automobile and adapted to be moved by the movement of the automobile to and from its brake testing position, anchoring means mounted on the carriage and constructed to hold the automobile in its brake testing position, and mechanism controlled by the movement of the carriage and operable to engage and disengage the anchoring means with the automobile.

21. An apparatus for testing brakes of automobiles, comprising in combination, a fixed support provided with rollers for supporting and rotating the rear wheel of an automobile, a traveling carriage provided with rollers for supporting and rotating the front wheel of an automobile, power mechanism for driving said rollers to turn the wheels under brake resistance, indicating mechanism for indicating the turning force applied to the automobile wheels by the rollers, a runway constructed to support the front wheel of an automobile as the wheel travels from the rollers of the fixed support to the rollers upon the carriage, and the carriage being supported for movement relative to said runway and adapted to position one of its rollers under said runway when the carriage is in its rearmost position so that the wheel will pass directly from the runway onto said roller.

22. An apparatus for testing brakes of automobiles, comprising in combination, a fixed support provided with rollers for supporting and rotating the rear wheels of an automobile, a traveling carriage provided with rollers for supporting and rotating the two front wheels of an automobile, power mechanism for driving said rollers to turn the wheels under brake resistance, indicating mechanism for indicating the turning force applied to the wheels by the rollers, a pair of spaced rails constituting a runway for said carriage, an intermediate rail, and clamping means secured to the carriage and provided with means for gripping said intermediate rail to secure the carriage in a fixed position.

23. An apparatus for testing brakes of automobiles, comprising in combination, a wheel rotating means, a power driven shaft, a system of gearing interposed between the shaft and wheel rotating means, a rocking member for supporting one of said gears for rocking movement in response to variations in the turning force imparted to the wheel by the gears, a shaft pivotally mounted adjacent said rocking member and provided with a lever arm, a movement multiplying connection between said rocking member and shaft to multiply the movement imparted to the lever arm by the rocking movement of said member, and an indicator connected to said arm to be actuated thereby to indicate the turning force imparted to the automobile wheel.

24. An apparatus for testing brakes of automobiles, comprising in combination, a wheel rotating means, a power driven shaft, a system of gearing interposed between the shaft and wheel rotating means, a rocking member for supporting one of said gears for rocking movement in response to variations in the turning force imparted to the wheel by the gears, a shaft pivotally mounted adjacent said rocking member and provided with a lever arm, a movement multiplying connection between said member and shaft to multiply the movement imparted to the lever arm and including a knife edge bearing, and an indicator connected to said arm to be actuated thereby to indicate the turning force imparted to the automobile wheel.

25. An apparatus for testing brakes of automobiles, comprising in combination, a wheel rotating means, a power driven shaft, a system of gearing interposed between the shaft and wheel rotating means, a rocking member for supporting one of said gears for floating movement, a pivotal shaft disposed adjacent said rocking member and provided with an offset bearing surface positioned to engage a bearing surface upon the floating member and to form a movement multiplying connection between the rocking member and shaft, a lever arm secured to said shaft to be rocked thereby, and an indicator connected to said arm to be actuated thereby to indicate the turning force imparted to the automobile wheel.

26. An apparatus for testing brakes of automobiles, comprising in combination, wheel rotating means, a power driven shaft, a system of gearing interposed between the shaft and wheel rotating means, a rocking member for supporting one of said gears for floating movement, a closed casing for housing the system of gearing and rocking member, a pivotal shaft extending through said casing and provided with a lever arm disposed outside of the casing, a movement multiplying connection between said rocking member and shaft, and an indicator connected to said arm to be actuated thereby to indicate the turning force imparted to the automobile wheel.

27. An apparatus for testing brakes of automobiles, comprising in combination, rollers for supporting and rotating an automobile wheel under brake resistance, a source of power for driving said rollers, a system of gearing interposed between the source of power and rollers, a rocking member for supporting one of said gears for floating movement, a pivotal shaft supported near said rocking member and provided with a lever arm extending along side said member for rocking movement relatively to the member, a movement multiplying connection between said rocking member and shaft, and an indicator connected to said arm to be actuated thereby to indicate the turning force imparted to the automobile wheel.

28. An apparatus for testing brakes of automobiles, comprising in combination, rollers for supporting and rotating an automobile wheel under brake resistance, a source of power for driving said rollers, a system of gearing interposed between the source of power and rollers, a rocking member for supporting one of said gears for floating movement, a shaft pivotally supported at both ends and disposed adjacent an end of the rocking member, a lever arm rigidly secured to said shaft, an offset projection upon said shaft between its supporting bearings and adapted to receive the rocking thrust exerted by the rocking member under the driving force of the gears, and an indicator connected to said arm to be actuated thereby to indicate the turning force imparted to the automobile wheel.

29. An apparatus for testing brakes of automobiles, comprising in combination, means for supporting and rotating a wheel of an automobile, power mechanism for driving said means to rotate the wheel, indicating mechanism for indicating the action of the brakes upon the rotating wheel, and automobile anchoring mechanism for anchoring the automobile in its brake testing position controlled for movement into anchoring engagement with the automobile by movement of the automobile to brake testing position and from anchoring engagement with the automobile by movement of the automobile from brake testing position.

30. In combination with a brake testing device for testing the brakes of an automobile, anchoring means associated therewith for anchoring an automobile in the brake testing position, comprising an automobile holding device movable into and out of anchoring engagement with the automobile, and means operable by the movement of the automobile to the brake testing position for engaging said holding device with the automobile and operable by the movement of the automobile away from the brake testing position for releasing the automobile.

31. In combination with a brake testing device for testing the brakes of an automobile, a traveling carriage adapted to be moved by an automobile as the latter moves to and from the brake testing position, anchoring means for anchoring an automobile in the brake testing position, and means operable by the movement of the carriage in one direction for engaging the anchoring means with the automobile and operable by the movement of the carriage in the opposite direction for releasing the automobile.

32. In combination with a brake testing device for testing the brakes of an automobile, anchoring means associated therewith for anchoring an automobile in the brake testing position and supported for movement to and from the automobile engaging position, a camming element operable to shift the anchoring means to one position, and means for shifting said element out of its active position to promote quick movement of the anchoring means to a second position.

33. In combination with a brake testing device for testing the brakes of an automobile, anchoring means associated therewith for anchoring an automobile in the brake testing position and supported for movement to and from the automobile holding position, a ramp operable to shift the anchoring means to one position, and means for effecting the movement of the ramp to an inoperative position to promote quick movement of the anchoring means to a second position.

34. In combination with a brake testing device for testing the brakes of an automobile, anchoring means associated therewith for anchoring an automobile in the brake testing position and supported for movement to and from the automobile holding position, a collapsible ramp operable to shift the anchoring means to one position, and means for releasing the ramp so that it will collapse and thereby promote quick movement of the anchoring means to a second position.

35. An apparatus for testing brakes of automobiles, comprising in combination, means for supporting and rotating the rear wheels of an automobile, a traveling carriage for supporting and rotating the front wheels of an automobile, power mechanism for driving said means and wheels, indicator mechanism for indicating the brake action on the rotating wheels, anchoring means upon the carriage for anchoring the automobile in the brake testing position, and means for shifting said anchoring means to and from its automobile holding position including a collapsible ramp.

36. An apparatus for testing the brakes of automobiles, comprising in combination, means for supporting and rotating a wheel of an automobile, power mechanism for driving said means and wheel, indicating mechanism for indicating the brake action on the rotating wheel, anchoring means for holding the automobile in the brake testing position, and means for shifting said anchoring means to and from its automobile holding position including a collapsible ramp.

37. An apparatus for testing brakes of automobiles, comprising in combination, means for supporting and rotating the rear wheels of an automobile, a traveling carriage for supporting and rotating the front wheels of an automobile, power mechanism for driving said means and wheels, indicating mechanism for indicating the brake action on the rotating wheels, anchoring means upon the carriage for anchoring the automobile in the brake testing position, means for shifting said anchoring means to and from its automobile holding position including a collapsible ramp supported independently of the carriage, and means upon the carriage for effecting the collapse of said ramp to thereby effect quick movement of the anchoring means.

In testimony whereof, I have signed my name to this specification.

CHARLES FRANCIS COWDREY.

DISCLAIMER 1,767,348.—*Charles Francis Cowdrey*, Fitchburg, Mass. AUTOMOBILE BRAKE-TESTING MACHINE. Patent dated June 24, 1930. Disclaimer filed January 7, 1939, by the assignee, *Bendix-Cowdrey Brake Tester, Inc.*

Hereby enters this disclaimer to claims 1, 2, 3, 5, 8, 11, 12, 13, 14, 15, 16, 17, 18, 20, 29, 30, and 31 of said patent.

[*Official Gazette January 31, 1939.*]